United States Patent Office 2,829,967
Patented Apr. 8, 1958

2,829,967

RECOVERY OF PLATINUM GROUP METALS FROM SULFIDIC RAW MATERIALS

Leo Schlecht, Ludwigshafen (Rhine), Germany, assignor to Badische Anilin- & Soda-Fabrik Aktiengesellschaft, Ludwigshafen (Rhine), Germany No Drawing. Application January 28, 1954
Serial No. 406,891

Claims priority, application Germany February 7, 1953

7 Claims. (Cl. 75—114)

This invention relates to improvements in the recovery of platinum metals from sulfidic raw materials.

The recovery of platinum metals from sulfidic copper ores, copper-nickel ores or similar ores containing platinum metals, is mainly carried out industrially by first enriching the platinum metals with the copper or copper and nickel by smelting the crude matte and blowing the crude matte, while slagging the iron, to form a converter matte, and then, in the recovery of the copper or nickel by electrolytic refining, obtaining the platinum metals as an anode sludge in so concentrated a form that they can be separated from one another and recovered in pure form.

In many cases, in particular when the ore has only a small nickel and copper content, this method by way of converter matte for the recovery of the copper and any nickel is less economical than working up the ore by wet methods, for example by leaching with acids, salt solutions or ammonia. In this case, however, the platinum metals contained in the raw material cannot be recovered or can only be recovered in unsatisfactory yields.

I have now found that the platinum metals can be recovered from sulfidic copper or copper-nickel ores or concentrates, or similar raw materials containing iron sulfide, by first converting the iron sulfide in the raw material at least partly into iron oxide by roasting, then preferably converting the remaining non-iron metal sulfides into soluble salts in particular by sulfatizing or chloridizing roasting, and then leaching the product with water, acids, salt solutions or ammonia, separating the solution from the residue consisting mainly of iron oxide, treating the said residue with chlorine, advantageously in aqueous suspension, thereupon separating from the iron oxide residue the platinum metals which have passed into solution and recovering the latter from the solution, preferably by precipitating them with a non-precious metal.

The conversion of the iron sulfide contained in the raw material into iron oxide is preferably effected by the turbulent layer-roasting method, for example at temperatures above about 600° C. After the sulfur has been volatilized to such an extent that only about enough sulfur remains in the roasted product as is necessary for combining with the copper and any nickel and cobalt, the roasting can be continued at lower temperatures, preferably with the addition of choridizing agents, such as sodium chloride, in order to convert the whole of the copper and any nickel and cobalt into readily soluble sulfates or chlorides. From this roasted product it is possible by leaching in known manner, for example with dilute sulfuric acid or ammonia, to bring the copper salt and any nickel and cobalt salts present practically completely into solution, whereupon the solution may be separated from the iron oxide residue by filtration.

It has been stated that by this leaching the platinum metals cannot be brought into solution or can only be brought into solution with unsatisfactory yields without special measures. If, however, chlorine is allowed to act on the roasted product, the platinum metals pass into solution in satisfactory yields. It is of special advantage when the acid which is used for leaching also contains other metal chlorides, in particular sodium chloride, because the recovery of the platinum metals can be brought to the desired yields in a shorter time.

The treatment with chlorine is usually carried out separately after the separation of the iron oxide residue from the metal salt solution. When using water or acid for leaching, however, the chlorine may be allowed to act at the same time as the leaching out of the metal salts so that the platinum metals pass into solution together with the metal salts.

If it is desired to bring the metals nickel, copper and cobalt into solution with ammonia the sulfidic raw material may be pre-roasted in the same way. The following chloridizing or sulfatizing roasting can in this case, however, be dispensed with. In both cases an iron oxide residue is obtained from which the platinum metals can be recovered by treatment with chlorine. The sulfidic material which has not been pre-roasted at all can also be treated with ammonia and air whereby, as is already known, the nickel, copper and cobalt pass into solution from their sulfides as complex ammonium sulfates. In this case there remains, however, a residue of iron sulfide, usually mixed with basic iron sulfate and/or hydroxide. The platinum metals can, however, also be recovered from this residue according to the present invention by first roasting it and then treating it with chlorine. In any case it is necessary to expel the ammonia and any ammonium salts still present from the residue obtained by leaching with ammonia, for example by heating with lime, in order to avoid the danger of explosions due to the formation of nitrogen chloride during the subsequent treatment with chlorine.

The platinum metals which have passed into solution can be precipitated together with the copper which has passed into solution in a simple manner by the action of metallic copper or metallic iron; they can also be separated by reducing agents, such as sulfurous acid or formic acid. The recovery of the individual platinum metals, as for example platinum separately from palladium, osminum, iridium, rhodium and ruthenium, can be carried out in known manner without difficulty because the mixture of platinum metals obtained by the present process is practically uncontaminated with foreign substances. The copper contained therein, for example when it is precipitated with copper, may be readily removed with nitric acid.

The following example will further illustrate this invention but the invention is not restricted to this example.

Example

A flotation concentrate containing 4.7% of nickel, 3.8% of copper, 43.7% of iron and 30.5% of sulfur, and which also contains, in each 1000 kilograms, 1.1 gram of platinum as well as 0.4 gram of palladium and 0.6 gram of other platinum metals (osmium, iridium and ruthenium), is roasted at 600° C. until the sulfur content amounts to about 7%. The roasted product is intimately mixed with 20% of sodium chloride and further roasted at 400° C. By leaching with 1% sulfuric acid, the whole of the copper and at least 90% of the nickel and cobalt pass into solution. After separating this solution there remains a residue consisting mainly of iron oxide which is treated with an aqueous chlorine solution, containing 20% of sodium chloride, while leading in chlorine gas. In this way 90% of the platinum as well as palladium and the other platinum metals pass into solution. The iron oxide residue practically free from platinum metals is exploited for the production of pig iron, while the platinum metals are precipitated from the separated solution with the aid of non-precious metals, such as copper or iron, or with formic acid.

I claim:

1. A process for the recovery of platinum group metals from a sulfidic raw material containing iron and at least one of the metals from the group consisting of copper, nickel and cobalt which comprises at least partly converting the iron sulfide into iron oxide by roasting, converting the sulfides of non-iron metals other than platinum group metals into soluble salts by another roasting treatment, treating the roasted product with a liquid to dissolve said soluble salts of non-iron metals other than platinum group metals, separating the iron oxide-containing residue from the liquid solution, acting upon said residue with an aqueous solution of chlorine to simultaneously convert the platinum group metals to their water-soluble chloride salts and dissolve said salts of the platinum group metals in said aqueous solution, separating the residue from the aqueous solution containing the dissolved salts of the platinum group metals, and recovering the platinum group metals by precipitating them from the aqueous solution.

2. A process for the recovery of platinum group metals from a sulfidic raw material containing iron and at least one of the metals from the group consisting of copper, nickel and cobalt which comprises at least partly converting the iron sulfide into iron oxide by roasting, converting the sulfides of non-iron metals other than platinum group metals into soluble salts by a subsequent chloridizing roasting treatment, treating the roasted product with a non-alkaline aqueous solution of chlorine to dissolve the non-iron metal salts and to simultaneously convert the platinum group metals to their water-soluble chloride salts and dissolve said salts of the platinum group metals in said aqueous solution, separating the residue from the aqueous solution containing the dissolved salts of the platinum group metals, and recovering the platinum group metals by precipitating them from the aqueous solution.

3. A process for the recovery of platinum group metals from a sulfidic raw material containing iron and at least one of the metals from the group consisting of copper, nickel and cobalt which comprises at least partly converting the iron sulfide into iron oxide by roasting, converting the sulfides of non-iron metals other than platinum group metals into soluble salts by another roasting treatment, treating the roasted product with a liquid to dissolve the salts of the non-iron metals other than platinum group metals, separating the iron oxide-containing residue from the liquid solution, acting upon said residue with an aqueous solution of chlorine and sodium chloride to simultaneously convert the platinum group metals to their water-soluble chloride salts and dissolve said salts of the platinum group metals in said aqueous solution, separating the residue from the aqueous solution containing the dissolved salts of the platinum group metals, and recovering the platinum group metals by precipitating them from the aqueous solution.

4. A process for the recovery of platinum group metals from a sulfidic raw material containing iron and at least one of the metals from the group consisting of copper, nickel and cobalt which comprises treating said materials with an aqueous solution of ammonia in the presence of an oxygen-containing gas to dissolve sulfides of non-iron metals other than platinum group metals, separating the iron-containing residue from the ammonia solution, roasting said residue to convert its content of iron compounds into iron oxide and to expel the ammonia content of said residue, acting upon the roasted iron oxide-containing product with an aqueous solution of chlorine to simultaneously convert the platinum group metals to their water-soluble chloride salts and dissolve said salts of the platinum group metals in said aqueous solution, separating the residue from the aqueous solution containing the dissolved salts of the platinum group metals, and recovering the platinum group metals by precipitating them from the aqueous solution.

5. A process for the recovery of platinum group metals from a sulfidic raw material containing iron and at least one of the metals from the group consisting of copper, nickel and cobalt which comprises roasting the iron content of the material to convert at least a part thereof into iron oxide and dissolving the non-iron metals other than the platinum group metals from the material and in any order, and treating the iron oxide-containing product with an aqueous solution of chlorine to simultaneously convert the platinum group metals to their water-soluble chloride salts and dissolve said salts of the platinum group metals in said aqueous solution.

6. A process for the recovery of platinum group metals from a sulfidic raw material containing iron and at least one of the metals from the group consisting of copper, nickel and cobalt which comprises roasting the material to convert at least a part of the iron sulfide into iron oxide, dissolving the non-iron metals other than the platinum group metals from the material, and treating the iron oxide-containing product with an aqueous solution of chlorine to simultaneously convert the platinum group metals to their water-soluble chloride salts and dissolve said salts of the platinum group metals in said aqueous solution.

7. A process for the recovery fo platinum group metals from a sulfidic raw material containing iron and at least one of the metals from the group consisting of copper, nickel and cobalt which comprises roasting the iron content of the material to convert at least a part thereof into iron oxide, treating the roasted product with an aqueous solution of ammonia to dissolve the non-iron metals other than the platinum group metals, and treating the resulting iron-containing residue with an aqueous solution of chlorine to simultaneously convert the platinum group metals to their water-soluble chloride salts and dissolve said salts of the platinum group metals in said aqueous solution.

References Cited in the file of this patent

UNITED STATES PATENTS

| 1,014,868 | Gadomsky | Jan. 16, 1912 |
| 1,190,549 | Hirsching | July 11, 1916 |
| 1,509,774 | Perkins | Sept. 23, 1924 |
| 1,833,686 | Meyer | Nov. 24, 1931 |
| 1,876,943 | Hull | Sept. 13, 1932 |
| 2,067,874 | Brown et al. | Jan. 12, 1937 |

FOREIGN PATENTS

| 13,799 | Australia | June 12, 1928 |